United States Patent [19]
Raidel

[11] 4,089,544
[45] May 16, 1978

[54] AXLE SUSPENSION

[76] Inventor: John E. Raidel, Rte. 9, Box 400-M, Springfield, Mo. 65804

[21] Appl. No.: 719,286

[22] Filed: Aug. 31, 1976

[51] Int. Cl.² ............................................ B60G 11/46
[52] U.S. Cl. ..................................... 280/709; 267/31; 280/715
[58] Field of Search ............... 280/679, 709, 704, 715, 280/718, 662, 669; 267/15 R, 31, 52

[56] References Cited

U.S. PATENT DOCUMENTS

| | | | |
|---|---|---|---|
| 3,390,895 | 7/1968 | Verdi | 280/704 |
| 3,406,983 | 10/1968 | Masser | 267/15 R |
| 3,434,707 | 3/1969 | Raidel | 267/31 |
| 3,664,452 | 5/1972 | Schaeff | 267/31 |
| 3,746,363 | 7/1973 | Borns | 267/15 R |
| 3,782,753 | 1/1974 | Sweet | 267/31 |
| 3,794,344 | 2/1974 | Raidel | 280/704 |
| 3,912,294 | 10/1975 | Raidel | 280/679 |

FOREIGN PATENT DOCUMENTS 651,074  2/1935  Germany .......................... 280/718

Primary Examiner—Joseph F. Peters, Jr.
Assistant Examiner—John A. Carroll
Attorney, Agent, or Firm—Rogers, Eilers, Howell

[57] ABSTRACT

A tag axle suspension that can adjust the load forces on tag axles or the like, with the tag axle supported upon swinging rigid torque arms pivoted to the vehicle frame at its opposite sides with leaf springs concentrically mounted with and parallel to the torque arms, and with hydraulic piston motors extending from the frame of the vehicle to each torque arm and a two-way hydraulic pump motor system. The hydraulic motors can operate one way to apply solid lifting forces directly to the torque arms intermediate the ends thereof to raise the tag axle. Upward forces on the tag axle are transmitted to the leaf springs, and by them to the hydraulic pistons to urge them upwardly, their upward movement being resiliently opposed by interposition into the hydraulic system of an accumulator having a predetermined gas pressure above the liquid.

15 Claims, 8 Drawing Figures

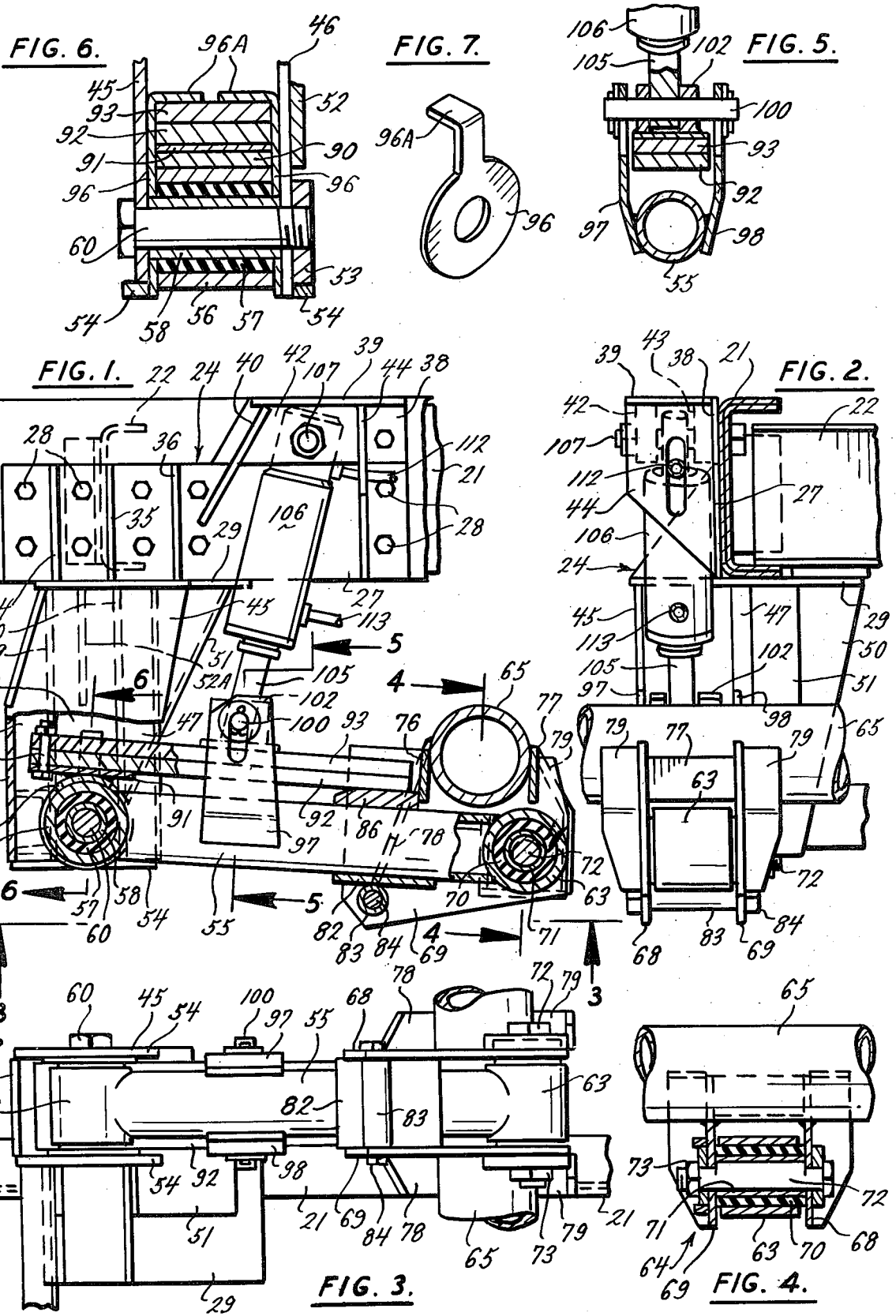

AXLE SUSPENSION

BACKGROUND OF THE INVENTION

The prior art may be exemplified by the applicant's prior U.S. Pat. No. 3,912,294 and art cited therein. The present invention provides in a very compact structure a combination of resilient hydraulic mechanical means applying downward forces to tag axle wheels with solid hydraulic means adjustable to set the maximum downward position of the tag axle wheels. The arrangement is such as to provide a maximum articulation of the tag axle, yet with virtually perpendicular force application to the axle-supporting torque beam.

Other prior art has had the tag axle supported at one end of the leaf springs, the other ends of which are pivotally mounted onto the frame, with a two-way hydraulic piston connected intermediate the spring ends. This arrangement does not afford as firmly-acting a suspension, as there is no solid lifting force applied to the wheels, and no solid torque arms to prevent axle chatter and brake hop. The height of the wheels cannot be accurately set in that construction.

THE PRESENT INVENTION

The present invention provides resistance to upward movement of the tag axle that is resilient because of two factors, one of which is the interposing of leaf springs between the tag axle and the hydraulic pistons and the other of which is the use of a gas charged accumulator in the hydraulic pressure line into which hydraulic liquid may back flow from the cylinders upon application of an upward thrust to the tag axle.

The present arrangement is designed to prevent axle chatter and brake hop under all circumstances. There can be no twisting of the axle during braking, since the axle is securely held by the solid metal torque arms. Also the leaf springs are not required to resist torsion forces, but are free-floating, and have rubber bushed load-bearing and load-adjusting features.

The present invention comprises a suspension for adjusting the load on a wheel or an axle, that can be used for tag axles, drive, or other axles. It will be described with a tag axle. When used on tandem axles, it can vary the load proportions applied to the individual axles. It can be used on multiple trailing axles, or on one leading and one trailing.

Where multiple axles are each provided with a set of the suspensions, the suspensions can be mounted back to back so that they trail one axle and lead the other, or they can both lead or trail.

The suspensions may be used on front or steering wheel mounts.

One reason for the versatility of the suspension is that it extends at most only a short distance beyond the wheel limits of the axle being controlled. It can also replace conventional spring suspensions, or supplement it as desired.

The suspension is thus capable of being used with conventional axle assemblies. As will be shown, it incorporates a torque arm that is pivotally connected to a bracket depending from the frame of the vehicle, and extends more or less horizontally from the pivot point, with an axle supported on its free end. The suspension may be used with a radius rod from the axle to the frame, defining with the torque arms a parallelogram movement.

Other features of the present construction are that the load distribution can be very accurately adjusted. Axle lifting, being performed by solid hydraulic forces transmitted by solid metal connections to the axle, without interpositions of any resilient means, can be very accurately adjusted.

Other advantages and features of the invention will appear from the description to follow.

IN THE DRAWINGS

FIG. 1 is a side elevation partly in section of a left side of a trailing or tag axle suspension embodying the invention;

FIG. 2 is a rear end view of the suspension of FIG. 1;

FIG. 3 is a bottom view thereof;

FIG. 4 is a vertical section through the axle seat assembly taken on the line 4—4 of FIG. 1;

FIG. 5 is a vertical section through the torque arm at the piston mounting, taken on the line 5—5 of FIG. 1;

FIG. 6 is a vertical section through the torque arm mounting taken on the line 6—6 at the left side of FIG. 1;

FIG. 7 is an isometric view of one of the leaf spring retaining clips or washers.

DESCRIPTION OF THE PREFERRED EMBODIMENT

Figure 8:
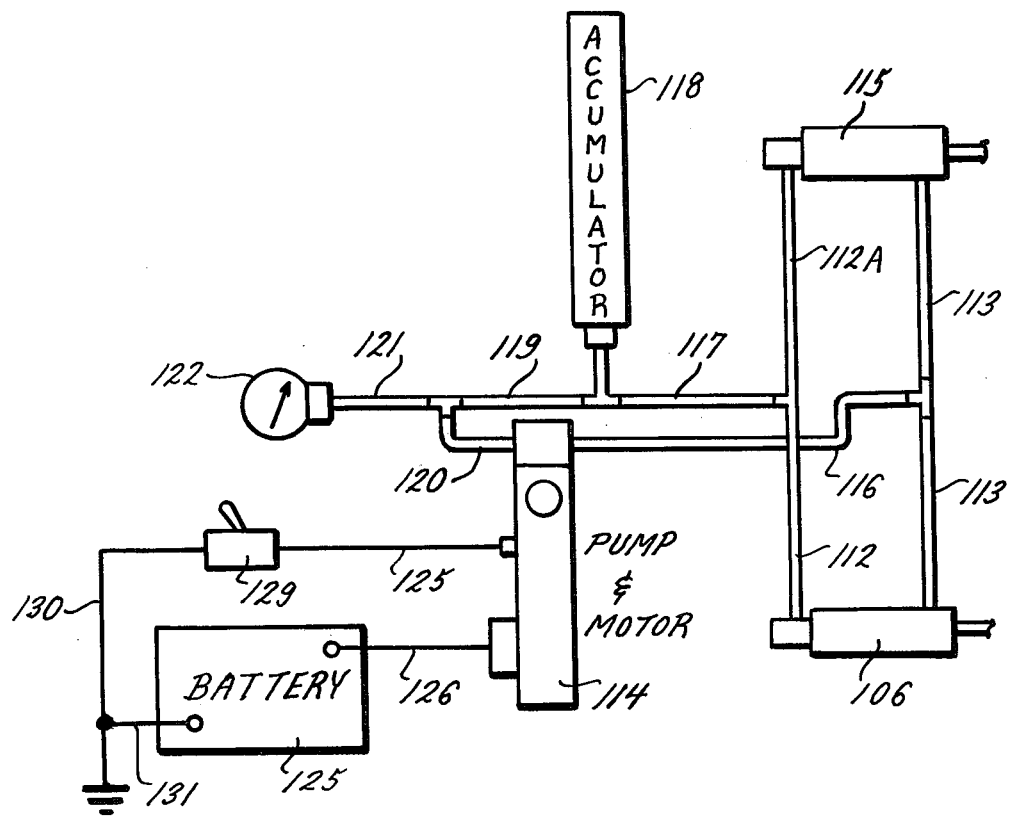
FIG. 8 is a hydraulic and wiring diagram of the suspension.

The suspension is particularly adapted to be used on the trailing or tag axle of a vehicle such as a trailer. Two suspension units are normally provided: one for each end of the trailing axle. The units are identical so only the left-hand one need be described in detail.

A frame rail 21 of the truck is illustrated as being in channeled form. Transverse beams such as 22 may be included as required.

A hanger assembly 24 is mounted upon and suspended from the vehicle frame. The hanger includes a vertical plate 27 adapted to lie along the outer face of the main frame 21 and to be bolted thereto by bolts 28. The hanger also includes a horizontal plate 29 secured to the vertical plate and extending both inwardly and outwardly of the frame channel 21. It may be in two pieces welded together. The inwardly extending part of the plate 29 lies beneath the frame rail 21 and the cross beam 21. A stabilizing spacer plate 30 (FIG. 2) is secured between the top of the horizontal plate 29 and the bottom of the cross channel 22. A plurality of vertical, triangular gussets 34, 35 and 36 are welded to the vertical plate 27 and the horizontal plate 29 to give strength and rigidity to the assembly.

There is an extension 38 above the upper edge of the vertical plate 27 and welded to it, in the upper right portion thereof in FIG. 1. A horizontal top plate 39 is welded to the upper edge of the extension 38, and a combination of reinforcing gusset plates are also welded to it. These include a sloping, more or less vertical, gusset plate 40 and a vertical gusset plate 44 with a sloping lower edge. Rocker support blocks 42 and 43 are welded to the adjacent parts for a purpose to appear. The blocks 42 and 43 are parallel, and fit below the top plate 39 and against the sloping forward plate 40 and the vertical rearward plate 44.

The hanger assembly 24 also includes depending parts. Below the frame 21 there is a first hanger side plate 45 that extends forwardly and downwardly as illustrated. This hanger plate 45 is designed to support one end of a rocking pivot disposed transversely to the vehicle, as will be explained. Opposite this hanger plate 45 and parallel to it to provide support for the opposite end of the rocking pivot is a support assembly. This assembly includes two depending spaced-apart rails, being a front hanger rail 46 flanged inwardly at the vertical part of its front edge, and a rear hanger rail 47 flanged inwardly along its rear edge. The rails are welded to the plate 29 from which they depend. An end plate 48 is welded to the hanger 45 and the front rail 46. Reinforcing gussets 49 and 50 are welded to the inside surfaces of the rails 46 and 47, respectively, and to the underside of the plate 29. A brace 51 of flanged cross section likewise is welded to the underside of the plate 29 and against the rail 47. A reinforcing plate 52 is welded between the two rails on their inside faces, and terminates above the bottom thereof. It extends laterally between the gussets 49 and 50. A shorter reinforcing plate 52A depends between the gussets 49 and 50 and is welded to the plate 29 and the reinforcing plate 52.

Below the reinforcing plate 52 a threaded block 53 is mounted and extends between the gussets 49 and 50. The block is welded to the rails to receive the cap screw of the rocking pivot to be described.

A reinforcing strap 54 is welded fore and aft of the assembly to the bottom of the rails 46 and 47 and the block 53.

A tubular torque beam 55 is pivotally supported at its forward end between the plate 45 and the block 53 in the manner shown particularly in FIG. 6. This torque beam 55 has a tubular cross head 56 welded to its forward end. The cross head 56 receives a cylindrical bushing 57 of rubber or like material that in turn surrounds a metal spacer sleeve 58 that extends between the plate 45 and the block 53 to maintain these parts separate. The sleeve 58 receives a cap screw 60 threaded into the block 53. By this arrangement a cushioned rocking support for the forward end of the torque beam 55 is provided.

The other end of the torque beam 55 has an assembly such as shown in U.S. Pat. No. 3,614,123 with an eccentric arrangement for adjustment. It includes a tubular rear cross head 63 welded to the torque beam, and adapted to be mounted in an axle seat assembly 64, that holds a tag axle 65 for wheels (not shown). The axle seat assembly 64 comprises parallel vertical walls 68 and 69 between which the cross head 63 extends. The cross head surrounds a rubber or like cushion bushing 70 that in turn surrounds a cylindrical spacer sleeve 71 of rigid material. An eccentric bolt 72 fits rotatably through the sleeve 71, and through the walls 68 and 69, with with a nut 73 on its outer end. The bolt 72 is rotatably adjusted within the sleeve 65 and then tightened against further rotation with appropriate lock nuts and the like, to adjust the end of the axle 65 relative to the torque beam 55.

The two depending walls 68 and 69 are rigidly held in parallel spaced relation by plates 76 and 77 that are secured to the axle 65 and the plates. There are also outside reinforcing elements for the axle seat assembly. These are wing gussets 78 and rearward wing gussets 79, of left and right formations. These plates are welded to the outside surfaces of axle support plates 68 and 69, and converge upwardly on each plate to be welded to the axle 65 at their upper ends.

In addition, there is a lower beam support plate 82 at the forward end of the axle seat assembly. It rests upon a sleeve 83 surrounding a bolt 84. Above the torque beam 55 and also standing between and welded to the plates 68 and 69 is a wear pad 86.

A spring arrangement is also provided for the torque arm assembly. At the forward end of the torque arm, there is an arcuate pad 90 concentrically supported on the outside of the cross head 56 and secured as by welding to a plate 91. Above the plate 91 are two leaf springs 92 and 93, that extend backwardly parallel to the torque beam 55. The two leaf springs are bolted together and to the plate 91, as shown as 95.

As shown in FIGS. 1, 6 and 7, the leaf springs are held down against the cross head 56 and supported on the cap screw 60. A pair of washers 96, one of which is shown individually in FIG. 7, have projecting bent fingers 96A as shown in FIG. 6. The washers 96 are mounted around the inner bushing 58, to cause the fingers 96A to overlie and hold the springs 92 and 93 down in fixed relationship to the bolt 50 and the cross head.

The two leaf springs 92 and 93 extend rearwardly, and their rear ends overlie the wear pad 86 with respect to which they may move. The springs, when relaxed, are normally bowed convexly upwardly, but their middle parts are depressed as will appear, causing their middle to be applying an upward force.

Approximately midway of the torque beam 55, a connection for an operating cylinder and piston assembly is provided. There are two side hanger plates 97 and 98, the lower ends of which are welded to the sides of the torque beam 55, as illustrated particularly in FIG. 5. Hanger plates 97 and 98 extend upwardly to above the springs 92 and 93, and have vertical slots through which a short pin 100 extends. The pin 100 has appropriate washers and cotter pins to hold it in place.

A U-shaped load pad assembly generally designated 102 consists of two spaced, parallel, vertical members welded to a horizontal member. The load pad assembly is pivotally hung on the pin 100, and can rest upon the top of the spring 93.

Between the vertical arms of the load pad assembly 102 the flattened end of a piston 105 is rockably mounted on the pin 100. The piston 105 extends into a hydraulic cylinder 106 that in turn is rockably mounted on a bolt 107 that spans between the parallel blocks 42 and 43 on the hanger 24. The cylinder is supplied with hydraulic fluid by flexible tubes 112 and 113 at its upper and lower ends, the former extending through a slot in the plate 44 as illustrated in FIG. 2.

There is an assembly as described for each side of the trailer axle. FIG. 8 shows the cylinder 106 and also another cylinder 115 for the other end of the axle 73. The tubes 113 are connected together, and a tube or pipe 116 runs from them to the pump and motor assembly 114. When the pump motor is operated in one mode, it applies pressure fluid through the pipe 116 and the pipe 113 to the lower ends of the cylinders 106 and 115.

The upper pipe 112 has its counterpart 112A extending from the other cylinder 115, and at their midpoint they are connected by a pipe 117 to an accumulator 118. The pipe 117 continues at 119 to a pipe 120 connected into the pump and motor. It is charged with hydraulic pressure fluid when the pump and motor operate to deliver fluid in the opposite direction from the one previously described. Another tube 121 leads to a pressure gauge 122.

The pump and motor are operated from a battery 125 having one side connected by wire 126 to the pump motor. The other wire 125 from the pump and motor leads through a two-way switch 129 and thence by a wire 130 to ground to which the other side of the battery is also connected at 131.

OPERATION

With the mechanisms mounted on the two opposite sides of the trailer and at opposite ends of the tag or trailing axle 65, the hydraulic system is charged with fluid and the electric mechanism is connected as indicated in FIG. 8. When the switch 129 is thrown in one direction, from a mid or neutral position, to a first operating position, it energizes the pump and motor 114 so as to deliver hydraulic fluid to the pipe 116, and to relieve liquid from the tube 120. When the switch is thrown in the opposite direction to a second operating position, it delivers hydraulic fluid to the pipe 120, and relieves liquid from the tube or pipe 116. When the switch 129 is in its neutral position, the pump and motor do not operate, but the liquid in the two tube systems is retained in the conditions existing therein when the motor and pump were stopped.

In the initial setup, it is necessary to adjust the eccentric bolts 72 to insure that the two ends of the axle dispose the two wheels on the axle 65 precisely so as to apply the load equally on the opposite ends. This adjustment is explained in the patents previously referred to.

It is initially assumed that the tag axle 65 is to rest its wheels upon the ground when its companion axle rests its wheels upon the ground, and that the load distribution onto the tag axle 65 is to be adjusted. It is first assumed that the tag axle load is to be reduced. To do this, the switch 129 is moved to its first position, and the pump and motor 114 are operated to supply liquid to the bottom of the cylinder 106 to apply a lifting force to the piston 105, tending to lift it, and with it the torque arm 55 to urge the two wheels on the traling axle 65 upwardly to reduce the load upon the tag axles to a desired amount. Thereupon the twoway switch is thrown to neutral position and the liquid is trapped within the cylinder, and the piping 113 and 116, holding the tag axle and wheels as adjusted.

In the foregoing action, pistons 105 draw upwardly on the pins 100 which at this point engage in the upper ends of the slots in the hanger plates 97 and 98 on each side of the trailer. Since the bracket arms 97 and 98 are welded to the torque arms 55, those arms are caused to pivot upwardly or counterclockwise in FIG. 1, about the pins 60. As the torque arms 55 swing upwardly at their rear ends, they carry the pre-set eccentric pins 72 and associated parts with them, tending to lift the assembly 64 including the axle 65. If there is a load on the axle at that time, for example, because its wheels are already resting upon the ground, the pins 84 will be in engagement with the plates 82 and will remain so, so long as that load continues. In this, the ends of the leaf springs are in engagement with the pads 81.

If under the foregoing circumstances it is desired to lift the trailing axle 65 further, perhaps to remove its wheels from the ground, the operation of the pump and motor 118 in the manner described is continued, lifting the pistons 105 and the torque arms 55 until the wheels are elevated.

In the foregoing adjustments, increasing the liquid below the pistons is accompanied by reducing the liquid above the pistons, with an effect to be described.

For any given setting by the pump, the liquid below the pistons determines the lowest position of the axle 65. So if the wheels on the axle 65 pass over a chuck hole, the axle will tend to drop, but will be held against dropping by the liquid below the pistons. The wear pad 86 being secured to the hanger 70 will, by engagement with the top of the torque bar 55, hold the axle hanger from pivoting downwardly.

It is important that the introduction of liquid from the pipe 117 be equally divided between the pipes 112 and 112a so that the T connection should be midway of these two pipes.

The operation of this tag axle adjustment is best understood by considering it as an adjunct to a companion axle and wheels. The load forces are essentially the mass in the trailer (neglecting weight of the equipment). That load is to be divided between the primary axle wheels and the tag axle wheels.

With the tag axle wheels suspended off the ground, and hence with no load, then in order to apply load to those wheels, the operator moves the switch 129 to energize the pump motor 114 to apply liquid pressure to the line 119. Liquid is forced through the pipes 119, 117, 112 and 112a to the tops of the cylinders 106 and 115. This liquid also increases the pressure in the accumulator 118. And at the same time, liquid is withdrawn from below the pistons 105. As liquid withdraws from below the pistons, and liquid pressure increases above them, the tag axle 65 descends to put its wheels onto the ground.

At this point, the load is being applied from the trailer to the primary axle wheels, and also by the pins 60 and the pistons 105 acting on the torque arms 55, to the tag axle wheels. In effect, this means that the amount of the trailer load applied to the tag axle is determined by the strength of the forces applied downwardly through the pistons 105 and the leaf springs 92–93. This load is also a function of the pressure above the floating piston in the accumulator. The load on the tag axle can be read by the operator from the appropriately calibrated gauge 122. The load can be adjusted in fractions of a pound.

The pump motor is operated thus until the desired load is applied to the tag axle.

Conversely, the load applied to the tag axle can be reduced by operating the pump motor oppositely by shifting the switch 129 oppositely from neutral. Such action applies liquid under pressure below the pistons 105, reduces the liquid above the pistons, and tends to lift the tag axle. That axle may be actually elevated to lift its wheels off the ground.

In all of these actions, the liquid below the pistons determines the lowest permitted position of the tag axle. Therefore if a tag wheel rides over a depression or chuck hole, it cannot descend below the point fixed by the liquid level below the pistons.

If the tag wheels ride onto a hump, they may apply an upward force to the axle 65. This tends to rock the torque arms about their pivot pins 60, and to apply upward forces onto the wear pads 86, acting upon the springs 92–93. These upward forces are opposed by the load acting through the accumulator pressure to the top of the pistons 105. Hence riding over a hump causes deflection of the leaf springs (the pins 100 being accommodated by the slots in the hangers 97–98). There is thus a dual cushioning effect, comprised of the leaf spring effect and the gas compression effect.

The present arrangement gives a large articulation range for the tag axle, as a result of applying the piston forces midway of the torque arms. There is no axle chatter or brake hop.

The foregoing arrangement means that there is a resilient leaf spring and gas-cushioned springing arrangement for the trailing axle that can be adjusted to change the load on the axle and the stiffness of the resistance to upward movement of the axle. By combining the trailing axle lifting means with the cushioning means, a simpler and more compact construction is provided.

Short leaf springs can be used because of the added cushioning effect that is provided through the cylinders 106 and 115. In this construction also the pivoting means for the torque arm acts as a pivoting means for the spring mounting. The present mounting also does not interfere with the spring mounting on the driving wheel which can have conventional shackles or the like connected to the frame.

Various changes and modifications may be made within the invention as will be readily apparent to those skilled in the art. Such changes and modifications are within the scope and teaching of this invention as defined by the claims appended hereto.

What is claimed is:

1. In a vehicle suspension: a torque arm for supporting a vehicle axle; means for mounting the torque arm upon a vehicle for movement in up and down directions relatively to the vehicle; a fluid motor for connection to the vehicle and to the torque arm, comprising a hydraulic cylinder and piston in the cylinder, a hydraulic pump, and fluid conduits from the pump to the opposite ends of the cylinder, and control means to enable liquid to act selectively on opposite sides of the piston, first substantially unyielding forcetransmitting connecting means including the fluid motor to transmit forces through the fluid motor unyieldingly between the vehicle and the torque arm in one direction, and second yielding force-transmitting connecting means including the fluid motor to transmit forces through the fluid motor yieldingly between the vehicle and the torque arm in the other direction.

2. In the suspension of claim 1, the second connecting means incorporating a resilient connection between the fluid motor and the torque arm.

3. In the suspension of claim 1, the second connecting means including leaf spring means alongside the torque arm, the connection being arranged to transmit force between the arm and the vehicle through the leaf spring.

4. In the suspension of claim 3: the leaf spring means and torque arm being pivotally mounted for swinging about the same axis, and being connected together adjacent that axis, but relatively movable at the opposite end of the leaf spring means.

5. In the suspension of claim 2: the resilient connection including a leaf spring between motor and the torque arm.

6. In the suspension of claim 2: the connecting means including a bracket on the torque arm projecting toward the motor; means connecting the bracket and the motor with a pin and slot connection, the pin engaging the end of the slot for the unyielding connection; the slot permitting the lost motion in the opposite direction for the yielding connection.

7. In the suspension of claim 1: the means for mounting the torque arm including a bracket attachable to the vehicle to depend therefrom; the torque arm having a crosshead of cylindrical shape pivotally mounted at one end onto the bracket and extending therefrom; a leaf spring disposed along the torque arm, a spring pad assembly between the leaf spring and the cross head, including a wear plate secured to the spring and having an arcuate surface concentric with and mounted on the cross head, means preventing the spring from being separated from the cross head; a second wear plate adjacent the other end of the leaf spring and fixed relatively to the axle; the connecting means being located intermediate the ends of the leaf spring.

8. In the suspension of claim 1, the fluid motor means being substantially transverse to the torque arm.

9. In the suspension of claim 1: the liquid conduit to introduce liquid to the cylinder device to effect movement in the said other direction having a resiliently yielding receptacle therein to cause the liquid to apply a yielding force.

10. In the suspension of claim 8: the liquid supply means including, as the receptacle, a gas charged hydraulic accumulator.

11. In the suspension of claim 1: the pump having motor apparatus to deliver liquid under pressure; means to operate the apparatus to pump liquid to the one side of the cylinder device to apply force to the torque arm in an axle-lifting direction, means to stop that operation and trap the liquid in the cylinder to hold the torque arm in a selected position from which it cannot recede; means to operate the apparatus to pump liquid to the other side of the cylinder to apply force to the torque arm in an axle depressing direction, said last-named arrangement including an accumulator having a resilient liquid receiving capacity whereby the force may be yieldable to accommodate lifting of the axle in use.

12. In the suspension of claim 1: the second connecting means including an accumulator interposed in the conduit between the pump and the cylinder, a gas-pressured piston in the accumulator receiving hydraulic liquid from the conduit on one side and gas compressible under pressure on the other, the second connecting means being yieldingly responsive to forces urging the torque arm toward the vehicle.

13. In the suspension of claim 12: a mechanical spring embodied in the second connecting means to incorporate mechanical yielding means between the torque arm and the vehicle, along with the accumulator.

14. In the suspension of claim 1: the second yielding means including a lost motion means between the motor and the torque arm.

15. In a vehicle suspension: a torque arm for pivotal mounting upon a vehicle; means for mounting an axle on the torque arm; and mechanism for applying upward and downward forces on the torque arm, including a hydraulic cylinder and piston, a liquid pump for supplying liquid selectively to opposite ends of the cylinder, and means for attaching the piston to the torque arm, said means for attaching the piston to the torque arm having a firm connection for positively limiting movement of the torque arm relatively to the piston in one direction, and said means for attaching the piston to the torque arm having a yieldable connection providing resiliently opposed relative movement between the torque arm and the piston in the other direction.

* * * * *